US012034872B1

United States Patent
Sharma et al.

(10) Patent No.: US 12,034,872 B1
(45) Date of Patent: Jul. 9, 2024

(54) HIGHLY AVAILABLE CERTIFICATE ISSUANCE USING SPECIALIZED CERTIFICATE AUTHORITIES

(71) Applicant: Amazon Technologies, Inc., Seattle, WA (US)

(72) Inventors: Param Sharma, Haymarket, VA (US); Todd Cignetti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 17/411,740

(22) Filed: Aug. 25, 2021

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/0861* (2013.01)

(58) Field of Classification Search
CPC .... H04L 9/3268; H04L 9/0825; H04L 9/0861
USPC ........................................................ 713/156
See application file for complete search history.

(56) References Cited

U.S. PATENT DOCUMENTS

| | | | | |
|---|---|---|---|---|
| 8,856,527 B1* | 10/2014 | Schwengler | ............ | H04L 63/00 713/168 |
| 10,439,825 B1* | 10/2019 | Meyer | .................... | H04W 12/04 |
| 2006/0085646 A1* | 4/2006 | Cutter | ..................... | G06F 21/10 713/175 |
| 2006/0190771 A1* | 8/2006 | Hefner | ................ | G06F 11/3684 714/38.14 |
| 2012/0023327 A1* | 1/2012 | Nagasaki | ............ | H04L 63/0823 713/156 |
| 2015/0381374 A1* | 12/2015 | Zömbik | ................ | H04L 9/3268 713/158 |
| 2018/0262347 A1* | 9/2018 | Levy | ........................ | H04L 9/006 |
| 2019/0260762 A1* | 8/2019 | Fynaardt | ............... | H04W 12/06 |
| 2021/0306161 A1* | 9/2021 | Medvinsky | ........... | H04L 9/3247 |

* cited by examiner

*Primary Examiner* — Moeen Khan
(74) *Attorney, Agent, or Firm* — NICHOLSON DE VOS WEBSTER & ELLIOTT LLP (57) ABSTRACT

Techniques for providing specialized certificate authorities are described. A method of providing specialized certificate authorities may include receiving a request to generate a private certificate at a specialized certificate authority, the specialized certificate authority configured to generate only one type of digital certificate using a user-specified template, generating a certificate based on the customer-specified template, and returning the certificate.

11 Claims, 8 Drawing Sheets

HIGHLY AVAILABLE CERTIFICATE ISSUANCE USING SPECIALIZED CERTIFICATE AUTHORITIES

BACKGROUND

Asymmetric cryptography systems use pairs of keys, including public keys and private keys, to encrypt and decrypt data. For example, a public key infrastructure (PKI) uses pairs of public and private keys to facilitate secure electronic communication. Public keys can be associated with digital certificates that certify the owner of a given public key. The digital certificates are created and signed by a public or private certificate authority which acts as a trusted third party. Various digital certificates can be used, e.g., to create secure connections over a network, such as the Internet. For example, Hypertext Transfer Protocol Secure (HTTPS) uses digital certificates to establish secure connections using Transport Layer Security (TLS).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for providing specialized certificate authorities (CAs). The specialized CAs (also referred to as nimble CAs) are highly available certificate authorities configured to generate only one type of certificate. According to some embodiments, a customer can request that a new specialized CA be generated. For example, a certificate management service which may provide both specialized CAs and fully featured enterprise CAs can receive the request (e.g., as an application programming interface (API) request, via a console or other user interface, etc.). The request may specify the type of CA to be generated (e.g., a specialized CA or an enterprise CA) and, if a specialized CA is specified, then the request may include a template to be used by the specialized CA when generating certificates. In some embodiments, a specialized CA is template locked. For example, once a specialized CA has been created with a particular template, that same specialized CA cannot generate certificate using any other template. If the customer no longer needs that kind of certificate, or needs to add a new kind of certificate, then a new specialized CA is generated using a template corresponding to the new type of certificate.

An enterprise private certificate authority typically enables a customer to create and sign a variety of certificate types to meet the various needs of a large enterprise. However, this typically provides more than is needed by a small customer, who may only require one or a few types of certificates to, e.g., enable communication among their instances. This makes for a more complicated user experience and, often, a more costly service, than the customer needs. As a result, smaller customers may resort to using self-signed certificates. While this may be used to create valid certificates that can be used, e.g., in TLS or other secure communication between instances, self-signed certificates do not provide any actual security benefits. Specialized certificate authorities address this problem by providing a simplified CA that is tailored to the customer's use case. This enables smaller customers to employ certificate-based security with less cost and complexity as compared to traditional enterprise CAs. Additionally, specialized CAs use a separate API than their enterprise CA counterpart. As a result, specialized CAs may also be used to provide improved security by limiting access to the full enterprise CA. Instead, if a computing resource is compromised, only the one type of certificate that can be generated by the specialized CA may be compromised, rather than the full range of certificates that may be generated by the enterprise CA.

Figure 1:
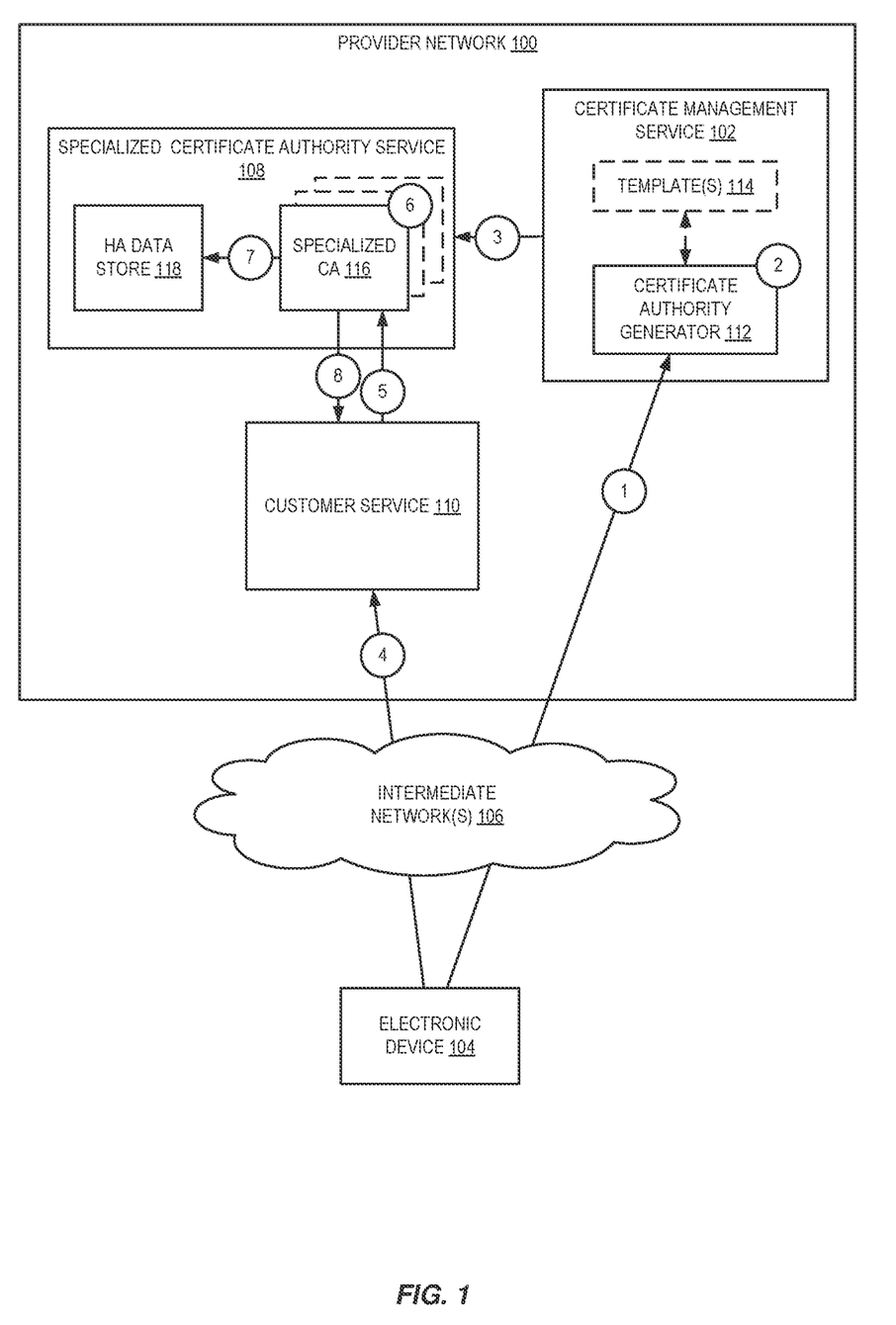
FIG. 1 is a diagram illustrating an environment for a specialized certificate authority service according to some embodiments.

FIG. 1 is a diagram illustrating an environment for a specialized certificate authority service according to some embodiments. As discussed, embodiments include a certificate management service 102 which can be used to create a specialized CA. The specialized CA is a root CA that is limited to generating certificates based on one customer-specified template. In some embodiments, the specialized CA is hosted by a specialized certificate authority service 108 which is backed by a high availability data store 118 for storing private keys. This ensures that certificates are highly available. Additionally, a separate API is provided to request a new certificate from a specialized CA in the specialized CA authority service. As compared to an enterprise CA's API, the specialized CA's API has fewer dependencies to improve the availability of the specialized CA.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function can include code provided by a user or other entity—such as the provider network itself—that can be executed on demand Serverless functions can be maintained within a provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

At numeral 1, a customer, using electronic device 104, can send a request to certificate management service 102 for a specialized CA. In some embodiments, the customer may access a certificate authority generator 112 and may provide information needed to generate the appropriate specialized CA. As discussed, a specialized CA is a pre-configured, self-managed Root CA, that has a limited feature set explicitly to issue certificates at scale for a particular use case. For example, if a CA is configured to issue TLS certificates using a particular template, then those are the only type of certificates it will be able to issue for its lifetime. In some embodiments, the request sent to certificate authority generator 112 may be an API request or may be a request sent via a console or other user interface. The request may specify the type of CA (e.g., a specialized CA or an enterprise CA) and may specify a template to be used when issuing certificates. In some embodiments, the request may include a custom template provided by the customer. Alternatively, the request may indicate a template from one or more supported templates 114 provided by the certificate management service 102. A template defines the attributes and/or ordering of attributes to be included in a digital certificate, such as a domain name, issue date, expiry date, public key, digital signature to be provided by the CA, etc.

At numeral 2, the certificate authority generator 112 generates an appropriate CA based on the request. For example, if a specialized CA has been requested, then a new specialized CA 116 is configured to issue certificates using the template specified as part of the request. In some embodiments, the specialized CA may be hosted in a specialized certificate authority service 108. Optionally, the specialized certificate authority service 108 may host multiple specialized CAs 116, each configured to issue certificates using a different specified template. This may include assigning the new specialized CA 116 to its own endpoint, which may be a URI/URL to which create certificate (e.g., createCert) requests may be sent. Additionally, the specialized CA 116 may be backed by a highly available data store 118, such as JournalDB, a Quantum Ledger Database (QLDB) or other highly available data store. The HA data store 118 may store the private key(s) used to issue new certificates. In various embodiments, the HA data store 118 stores the private keys encrypted.

Once the specialized CA has been setup, at numeral 4 the customer may configure their service 110 to use the specialized CA when a new certificate is needed. For example, the customer may provide the endpoint associated with the specialized CA, a resource identifier, or other identifier usable by the customer service 110 to direct a request for a new certificate. At numeral 5, the customer service sends a request to the specialized CA 116 for a new certificate. For example, such a request may be triggered when an existing certificate is nearing its expiry date, a new instance may be in the process of being added to the customer service and needs a new certificate, etc. The request sent at numeral 5 may be an API request which uses a lightweight API with few dependencies. A typical enterprise CA API relies on approximately 45 different services to function. If any one of these services becomes unavailable, then the enterprise CA is no longer able to issue new certificates. This makes enterprise CAs less than ideal for high availability applications which have uptime guarantees greater than any of the services on which the enterprise CA API depends. In particular, this greatly affects the ability of the system to scale, as when issuing thousands of certificates, the downtime of any of those dependent services can become a major performance factor. To address this, the specialized CA API may have few dependencies. For example, the API may only require that the specialized certificate authority service 108 be available, without any dependency on other services. Alternatively, the specialized CA API may have very few dependencies, such as fewer than five, or may be limited to being dependent on highly available services. At numeral 6, the specialized CA generates a certificate for the requestor. In some embodiments, this may include populating the template it is configured to use with information associated with the requestor, included in the request, or otherwise available to the specialized CA 116. At numeral 7, the specialized CA 116 can retrieve the private key associated with the customer and/or that has been indicated as to be used with certificates issued by this specialized CA. The specialized CA then uses the private key to sign the new certificate and returns the new certificate at numeral 8, to the customer service.

Figure 2:
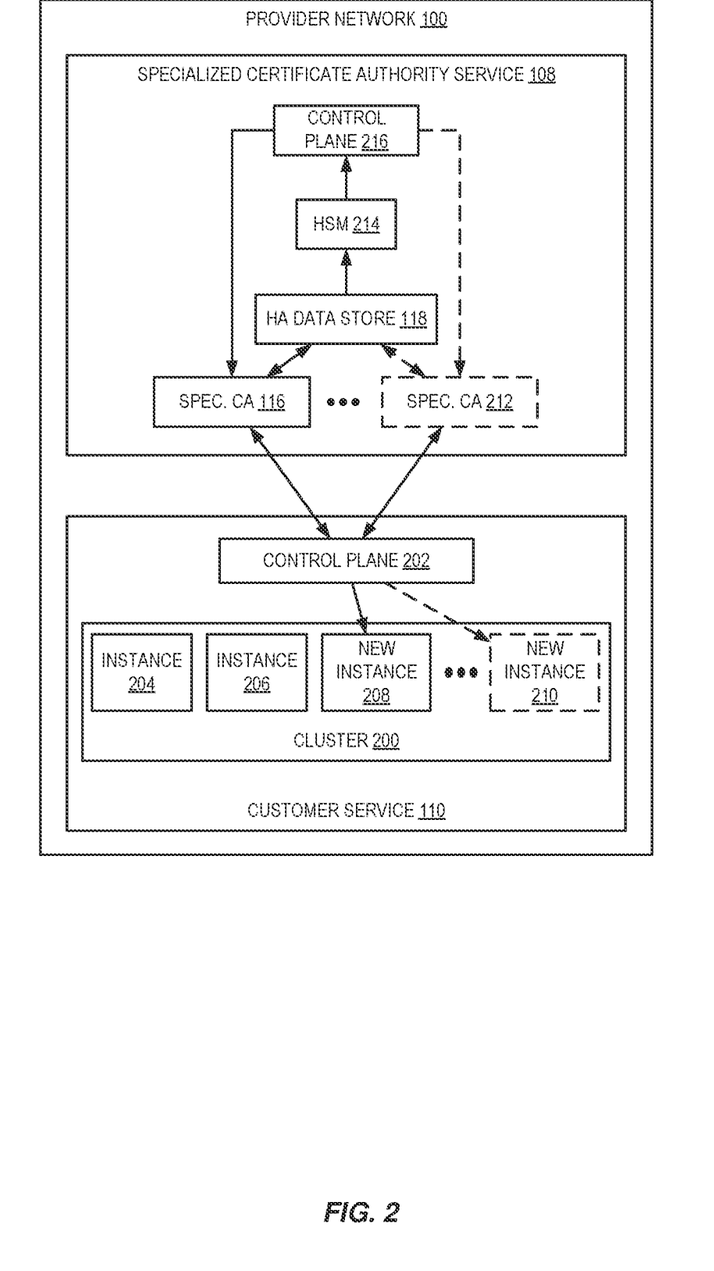
FIG. 2 is a diagram illustrating an environment for managing specialized certificates by a specialized certificate authority service according to some embodiments.

FIG. 2 is a diagram illustrating an environment for managing specialized certificates by a specialized certificate authority service according to some embodiments. As shown in FIG. 2, a customer service 110 may include a cluster 200 of instances 204-210. In some embodiments, the cluster of instances may run on a single physical host or a plurality of physical hosts. Each instance 204-210 may be issued its own certificate, to facilitate communication among, e.g., the instances of the cluster, with instances outside of the cluster, end user devices, etc. The customer service 110 may also include a control plane 202. As discussed, the control plane generally includes one or more control plane components distributed across and implemented by one or more control servers. Control plane traffic generally includes administrative operations, such as system configuration and management (e.g., resource placement, hardware capacity management, diagnostic monitoring, system state information). For example, the control plane 202 may be responsible for monitoring the performance of the cluster and deploying additional instances if the service is not meeting demand.

In some embodiments, when the control plane 202 determines that additional instances need to be added to the cluster 200, the control plane obtains one or more certificates for each instance being added. For example, the control plane 202 may request a first certificate type from specialized CA 116 and may optionally request different certificate types from one or more additional specialized CAs 212. When a specialized CA 116, 212 receives a new certificate request, it generates the new certificate using the template that it was configured to use when it was created. This may include adding attribute data to the new certificate in accordance with the template. This attribute data may be obtained from the request or from other sources. The specialized CA 116, 212 then obtains a private key from HA data store 118, and signs the new certificate using the private key. As discussed, the private keys may be stored encrypted by HA data store 118. As such, the private key may first be provided to a hardware security module (HSM) 214 to decrypt the private key before it is provided to specialized CA 116. In various embodiments, the private key can be provided to HSM 214 for decryption which then makes the decrypted private key available to control plane 216 which instructs the specialized CA 116 to sign the certificate using the private key. This would likewise happen for each specialized CA which is requested to provide a certificate. Once a specialized CA issues the signed certificate, it is returned to the control plane 202 which can provide the signed certificate to the new instance 208, 210 for which it was requested.

Figure 3:
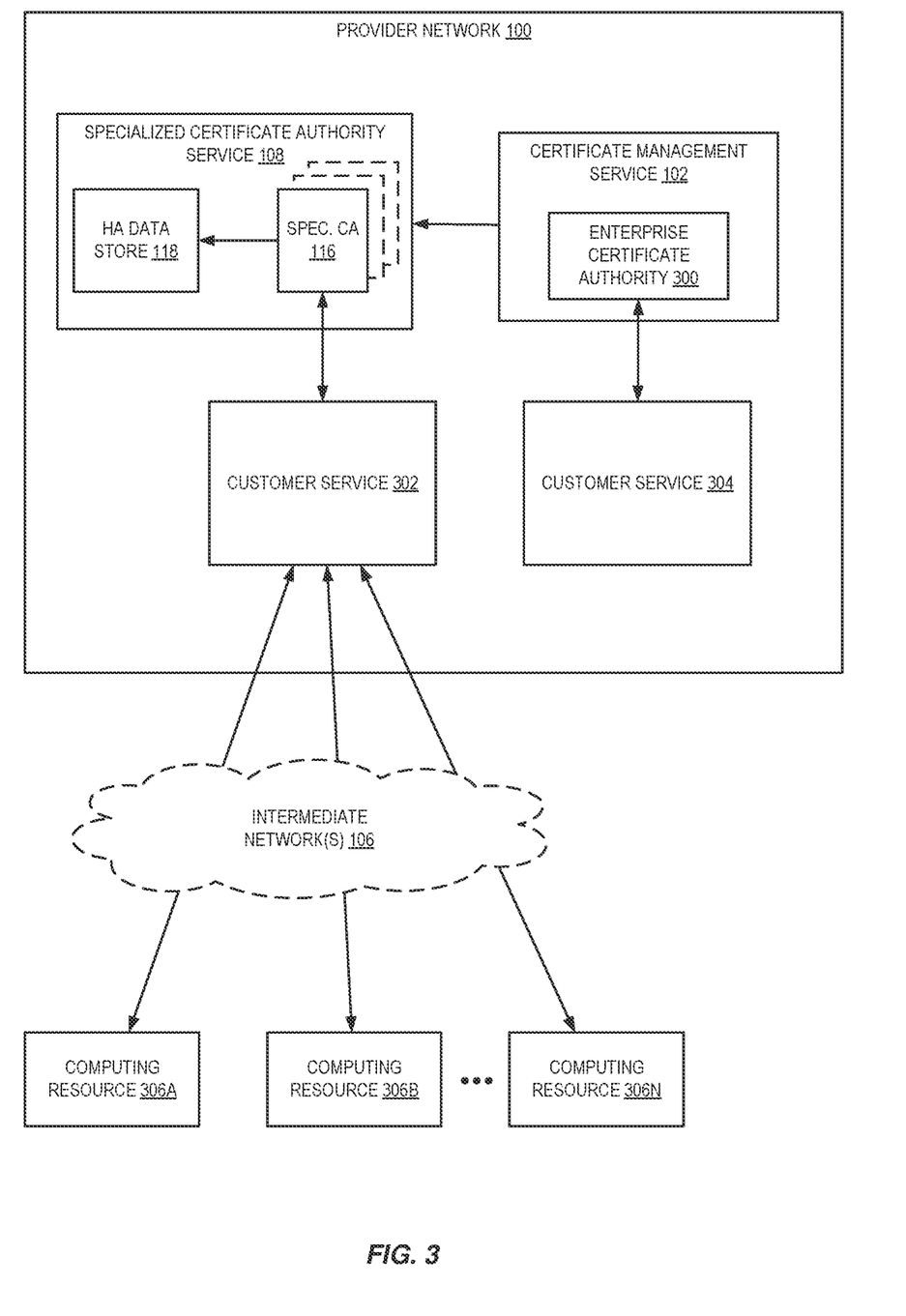
FIG. 3 is a diagram illustrating an environment for managing specialized certificates and enterprise certificates according to some embodiments.

FIG. 3 is a diagram illustrating an environment for managing specialized certificates and enterprise certificates according to some embodiments. In some embodiments, a customer may make use of both an enterprise certificate authority and one or more specialized certificate authorities. As discussed, the specialized CA 116 can only issue one type of certificate corresponding to the template that was selected when that specialized CA was created. As such, should the specialized CA be compromised, the scope of that breach is limited to that one type of certificate. Unlike the specialized CA, an enterprise CA 300 is capable of issuing a wide variety of certificates. As such, should the enterprise CA 300 be compromised, the scope of such a breach could be significant since many different certificates that provide access to many different aspects of the customer's infrastructure being potentially obtained. As such, the customer may wish to provide certificates to some of their services via a specialized CA so as to limit access to the enterprise CA 300.

For example, customer service 302 may communicate with resources outside of provider network 100. These computing resources 306A-306N may include end user devices, internet of things (IoT) devices, customer networks, etc. The computing resources 306A-306N may be accessible to the customer service 302 via one or more intermediate networks 106 or may be located outside of provider network 100 but directly accessible to provider network 100. Because computing resources 306A-306N operate in less controlled environments than provider network 100, each computing resource may represent a potential security vulnerability. Accordingly, the customer may choose to provide a specialized CA 116 specifically for customer service 302. Should the customer's resources be compromised, the scope of this vulnerability would then be limited to the type of certificate issued by the specialized CA 1116 (or multiple specialized CAs which the customer service 302 may use). Customer service 302, as shown in FIG. 3 exists within provider network 100 and does not communicate with external computing resources. As such, the security of customer service 304 may be higher as the resources underlying the service 304 operate in a controlled environment. Accordingly, customer service 304 may obtain certificates of various types from enterprise CA 300.

Figure 4:
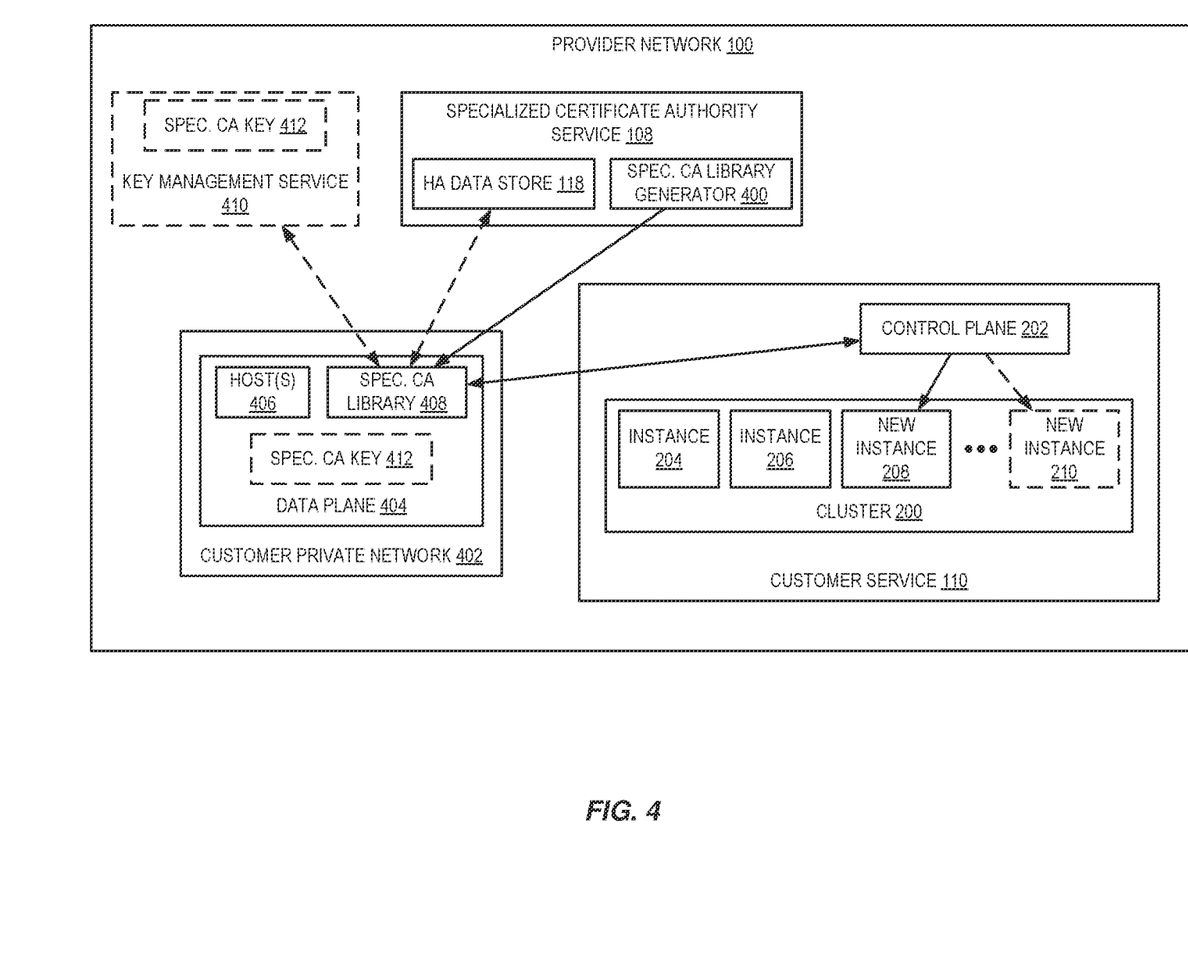
FIG. 4 is a diagram illustrating an environment for managing specialized certificates in a customer's infrastructure according to some embodiments.

FIG. 4 is a diagram illustrating an environment for managing specialized certificates in a customer's infrastructure according to some embodiments. As shown in FIG. 4, in some embodiments, specialized CA service 108 may enable a customer to host a specialized CA library. In such embodiments, the specialized CA service 108 includes a specialized CA library generator 400. The specialized CA library generator 400 adds a library wrapper around a cryptographic library, such as Bouncy Castle or OpenSSL, and may use a key management service as a backend for managing private keys.

In some embodiments, when the customer requests a specialized CA, the specialized CA library generator 400 generates the specialized CA and adds it to a specialized CA library 408. The specialized CA library is then provided to the customer who can implement it in their own private network 402 within provider network 100. In some embodiments, the specialized CA library 408 is implemented in the customer's data plane, such as on one or more hosts 406 or an instance running on a host 406. Thereafter, when the customer's service needs new certificates, it can contact the specialized CA library 408 for the certificates. In some embodiments, multiple specialized certificate libraries may be created and deployed to the customer's data plane, each issuing its own type of certificate based on a customer-specified template.

As shown in FIG. 3, a customer service 110 may include a cluster 200 of instances 204-210. As discussed, the cluster of instances may run on a single physical host or a plurality of physical hosts, and each instance 204-210 may be issued its own certificate, to facilitate communication among, e.g., the instances of the cluster, with instances outside of the cluster, end user devices, etc. The customer service 110 may also include a control plane 202. When a new instance is being setup, the control plane 202 can request a new certificate for the new instance from the specialized CA library 408. When the specialized CA library receives a certificate request, it can generate the certificate using the template that it was configured to use when it was created. This may include adding attribute data to the new certificate in accordance with the template. This attribute data may be obtained from the request or from other sources. The specialized CA library 408 then requests a copy of the private key. Optionally, the private key 412 may be maintained in a key management service 410. Alternatively, the private key may be maintained in a high availability data store 118, as discussed above. In either case, the private key may be decrypted, e.g., by an HSM, and provided to the specialized CA library to sign the certificate. Further alternatively, in some embodiments, the specialized CA private key 412 may also be stored, decrypted, in the customer's infrastructure (e.g., on a host in the customer's data plane). In such instances, the specialized CA library 408 can operate offline, without any dependencies outside of the customer's private network. Once the signed certificate has been issued, the control plane 202 provides the signed certificate to the new instance 208, 210 for which it was requested.

Figure 5:
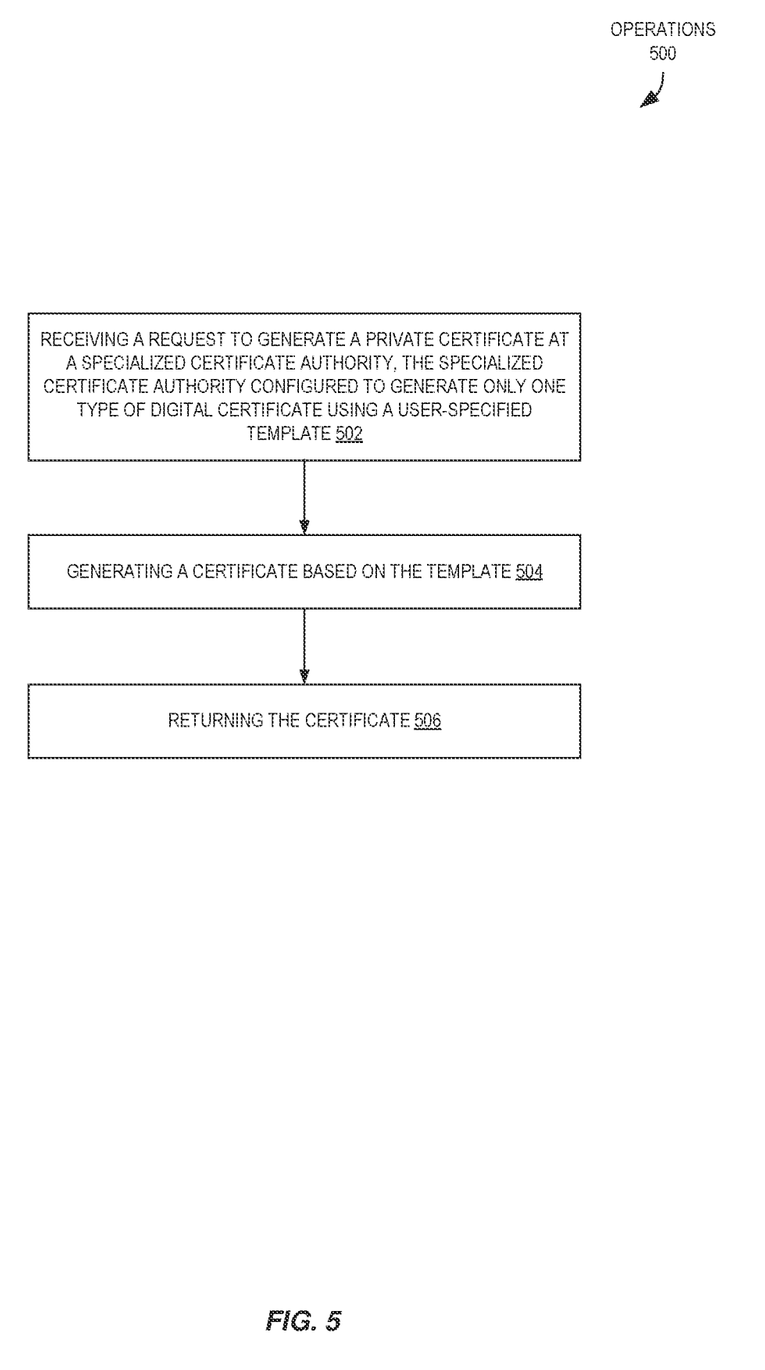
FIG. 5 is a flow diagram illustrating operations of a method for managing specialized certificate authorities according to some embodiments.

FIG. 5 is a flow diagram illustrating operations 500 of a method for managing specialized certificate authorities according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by specialized CA service 108, certificate management service 102, etc. of the other figures.

The operations 500 include, at block 502, receiving a request to generate a private certificate at a specialized certificate authority, the specialized certificate authority configured to generate only one type of digital certificate using a user-specified template. In some embodiments, the request to generate a private certificate is received using a specialized certificate authority application programming interface (API), and wherein the second request to generate a second private certificate is received using an enterprise certificate authority API. In some embodiments, the specialized certificate authority API has fewer dependencies than the enterprise certificate authority API. In some embodiments, the first customer service serves computing resources executing outside of the multi-tenant provider network.

The operations 500 further include, at block 504, generating a certificate based on the user-specified template. For example, as discussed, the attributes of the certificate, as defined by the specialized CA's corresponding template, are added to the certificate using information from the request or other sources. Once the certificate has been generated, in some embodiments, the private key associated with the specialized CA is retrieved and the certificate is signed using the private key.

The operations 500 further include, at block 506, returning the certificate. In some embodiments, the request may originate from a customer service. The signed certificate can be returned to the customer service where it can be deployed to a host and/or instance in the customer's service. For example, a control plane of the customer service may deploy additional instances to the customer service. The control plane can request the certificate and then provide the signed certificate to the new instance being deployed to the customer service.

In some embodiments, the operations further include receiving a request to generate the specialized certificate authority, the request including a selection of the user-specified template, and generating the specialized certificate authority, wherein the specialized certificate authority is associated with the user-specified template for its lifespan. In some embodiments, the specialized certificate authority is hosted by a specialized certificate authority service of a multi-tenant provider network. In some embodiments, the specialized certificate authority is hosted by a host of a control plane of a customer service implemented in a multi-tenant provider network. In some embodiments, a private key associated with the specialized certificate authority is maintained in a high availability data store.

In some embodiments, the operations further include receiving a second request to generate a second private certificate at a second specialized certificate authority, the second specialized certificate authority configured to generate only one second type of digital certificate using a second user-specified template, wherein the specialized certificate authority and the second specialized certificate authority are configured to issue different types of certificates.

In some embodiments, the operations further include receiving a second request to generate a second private certificate at an enterprise certificate authority, the enterprise certificate authority configured to issue a plurality of certificate types based on a plurality of different templates, and wherein the request to generate a private certificate is received from a first customer service of a multi-tenant provider network and wherein the second request to generate a second private certificate is received from a second customer service of the multi-tenant provider network.

In some embodiments, the operations include receiving a first request to generate a specialized certificate authority by a certificate management service of a provider network, the specialized certificate authority configured to generate only one type of digital certificate using a customer-specified template, the request including a selection of the customer-specified template to be associated with the specialized certificate authority, generating the specialized certificate authority, receiving a second request at the specialized certificate authority to generate a private certificate, issuing a certificate based on the customer-specified template by the specialized certificate authority, and returning the certificate. In some embodiments, the operations further include retrieving a private key associated with the specialized certificate authority from a key management service of the provider network, and signing the certificate using the private key. In some embodiments, the specialized certificate authority and a corresponding private key are hosted in a specialized certificate authority service of the provider network.

Figure 6:
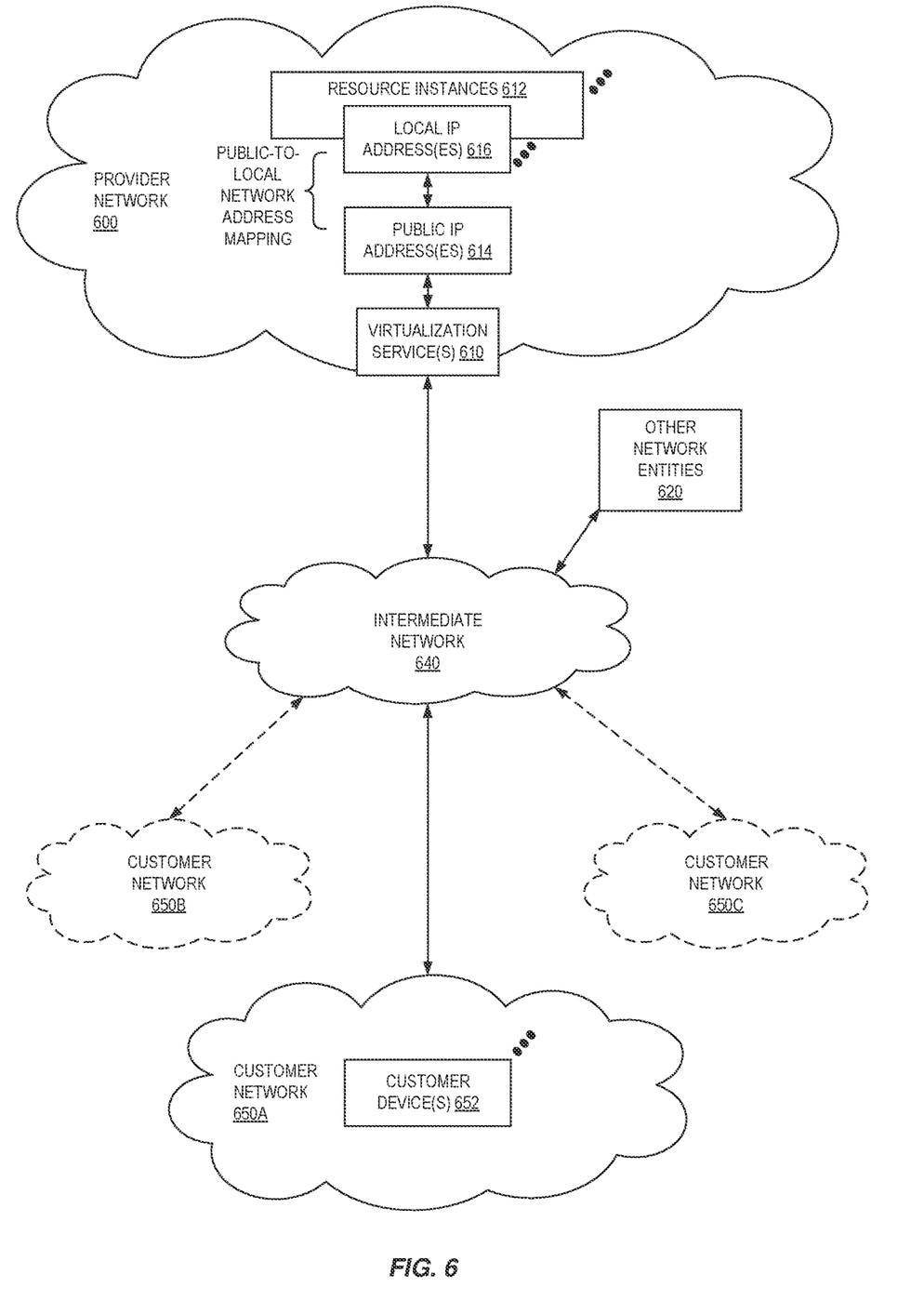
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
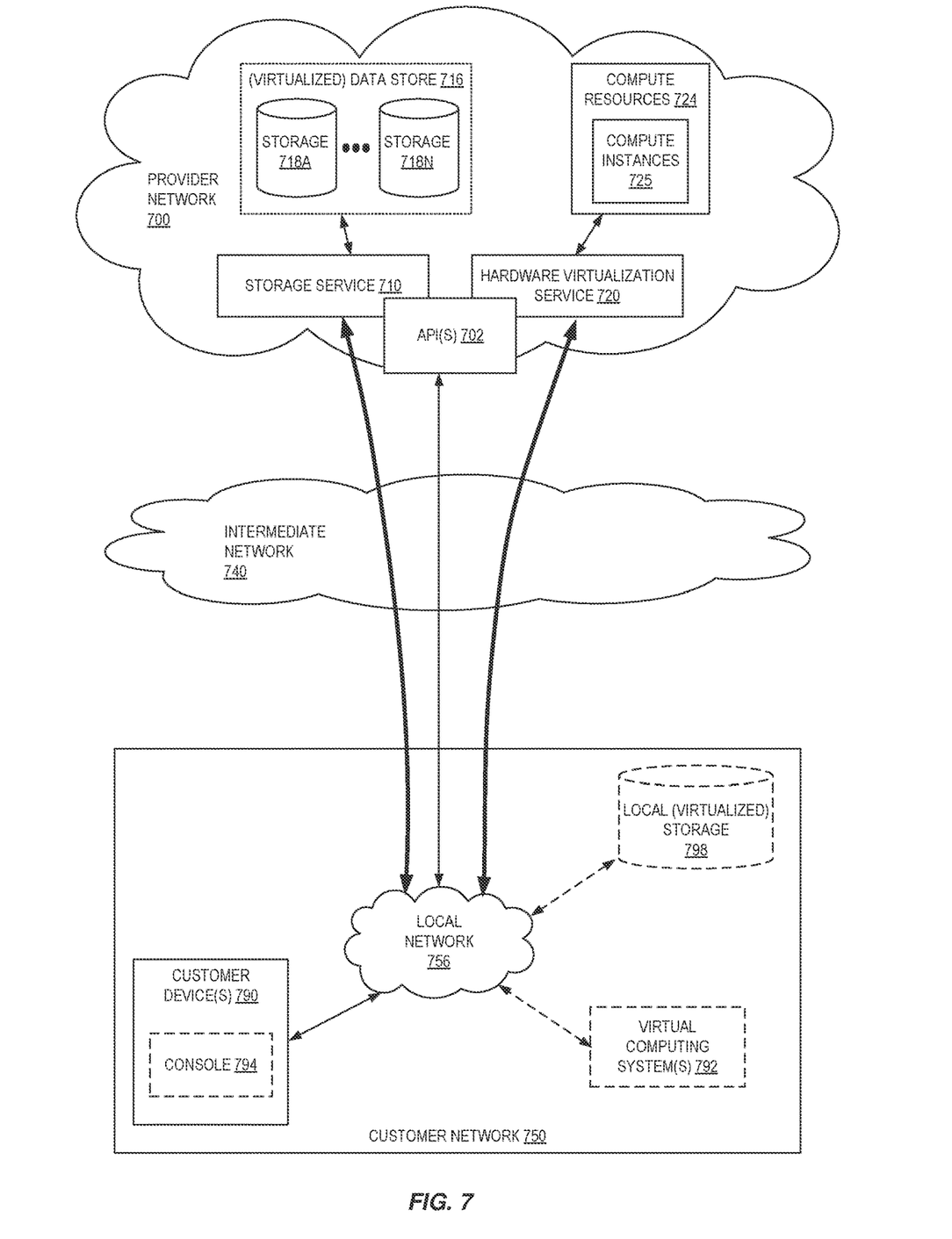
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
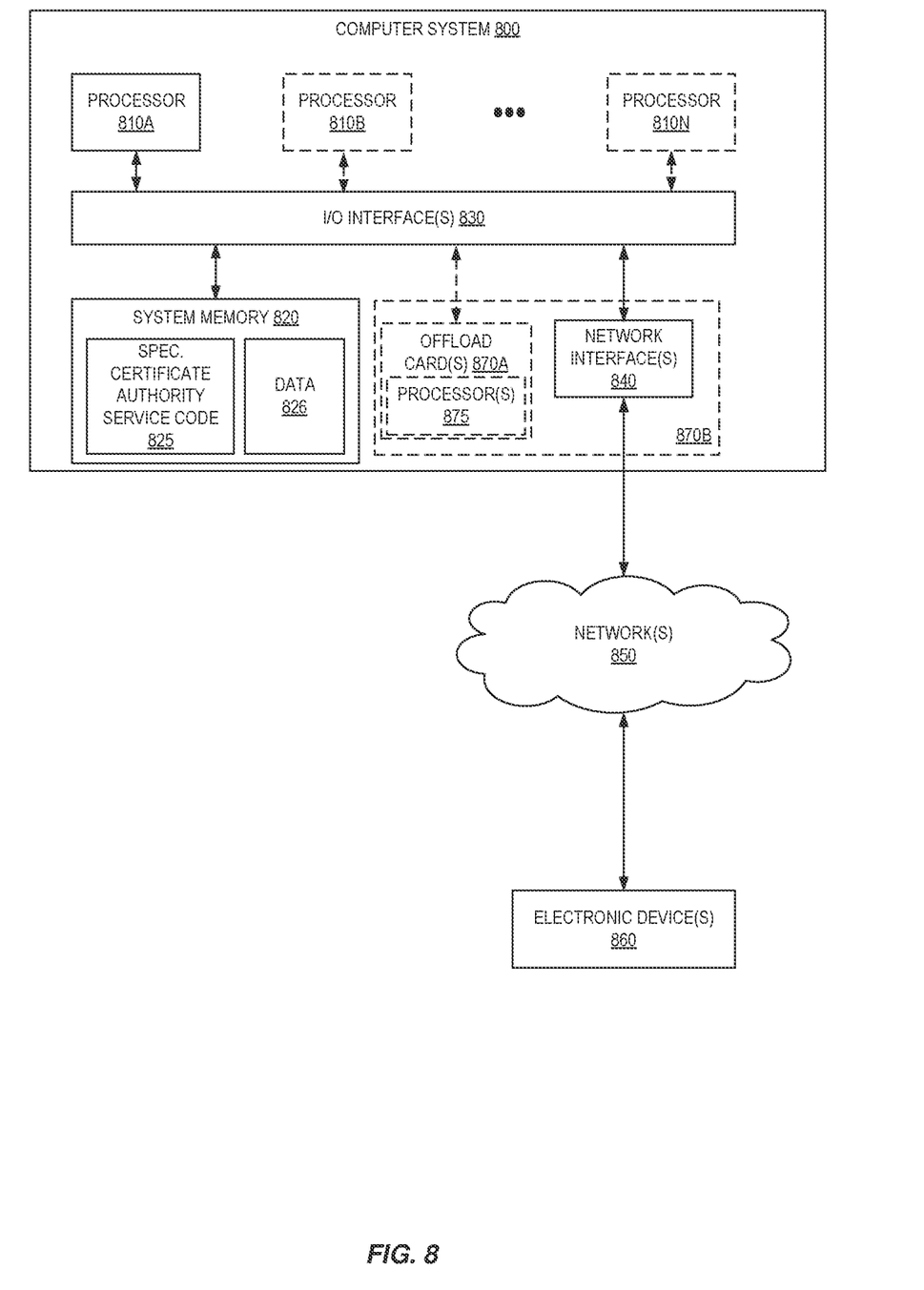
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as specialized certificate authority service code 825 (e.g., executable to implement, in whole or in part, the specialized certificate authority service 108) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving a request to generate a specialized certificate authority, the request received by a certificate management service of a multi-tenant provider network, the request including a selection of only one customer-specified template to be associated with the specialized certificate authority for a lifetime of the specialized certificate authority;
generating, in response to the request to generate the specialized certificate authority, the specialized certificate authority to have the lifetime and configured to issue for the lifetime of the specialized certificate authority only one type of digital certificate using the only one customer-specified template;
wherein generating the specialized certificate authority comprises storing an encrypted form of a private key of the specialized certificate authority used to issue new certificates in a highly available data store of the multi-tenant provider network;
wherein the specialized certificate authority is hosted by a host of a control plane of a customer service that is implemented in the multi-tenant provider network;
receiving a plurality of requests via an endpoint for the specialized certificate authority during the lifetime of the specialized certificate authority, each request of the plurality of requests to issue a respective new digital certificate for a respective instance being added to a cluster of instances of the customer service;
issuing, for each request of the plurality of requests, the respective new digital certificate as the only one type of digital certificate and using the only one customer-specified template;
wherein the respective new digital certificate comprises a respective digital signature created using a decrypted form of the private key of the specialized certificate authority;
wherein issuing, for each request of the plurality of requests, the respective new digital certificate comprises:
obtaining, by a hardware security module in the multi-tenant provider network, the encrypted form of the private key from the highly available data store,
decrypting, by the hardware security module, the encrypted form of the private key to yield the decrypted form of the private key, and
providing the decrypted form of the private key to the specialized certificate authority for use by the specialized certificate authority to create the respective digital signature of the respective new digital certificate; and
returning, in response to each request of the plurality of requests, the respective new digital certificate to the control plane of the customer service, wherein the control plane of the customer service provides the respective new digital certificate to the respective instance being added to the cluster of instances of the service.

2. A computer-implemented method comprising:
generating a specialized certificate authority to have a lifetime and configured to generate only one type of digital certificate using only one user-specified template for the lifetime of the specialized certificate authority; wherein generating the specialized certificate authority comprises storing an encrypted form of a private key of the specialized certificate authority used to issue new certificates in a highly available data store of a multi-tenant provider network;
wherein the specialized certificate authority is hosted by a host of a control plane of a customer service implemented in the multi-tenant provider network;
receiving a plurality of requests via an endpoint for the specialized certificate authority during the lifetime of the specialized certificate authority, each request of the plurality of requests to issue a respective new digital certificate for a respective instance being added to a cluster of instances of the customer service; and
issuing, for each request of the plurality of requests, the respective new digital certificate as the only one type of digital certificate and using the only one user-specified template;
wherein the respective new digital certificate comprises a respective digital signature created using a decrypted form of the private key of the specialized certificate authority;
wherein issuing, for each request of the plurality of requests, the respective new digital certificate comprises:
obtaining, by a hardware security module in the multi-tenant provider network, the encrypted form of the private key from the highly available data store,
decrypting, by the hardware security module, the encrypted form of the private key to yield the decrypted form of the private key, and
providing the decrypted form of the private key to the specialized certificate authority for use by the specialized certificate authority to create the respective digital signature of the respective new digital certificate; and
returning, in response to each request of the plurality of requests, the respective new digital certificate to the control plane of the customer service, wherein the control plane of the customer service provides the respective new digital certificate to the respective instance being added to the cluster of instances of the customer service.

3. The computer-implemented method of claim 2, further comprising:
receiving a request to generate the specialized certificate authority, the request including a selection of the only one user-specified template.

4. A system comprising:
a first one or more electronic devices to implement a certificate management service in a multi-tenant provider network;
a second one or more electronic devices to implement a specialized certificate authority service in the multi-tenant provider network, the specialized certificate authority service including instructions that upon execution cause the specialized certificate authority service to:
generate a specialized certificate authority to have a lifetime and configured to generate only one type of digital certificate using only one user-specified template for the lifetime of the specialized certificate authority;
receive a plurality of requests via an endpoint for the specialized certificate authority during the lifetime of the specialized certificate authority, each request of the plurality of requests to issue a respective new digital certificate for a respective instance being added to a cluster of instances of the customer service; and issue, for each request of the plurality of requests, the respective new digital certificate as the only one type of digital certificate and using the only one user-specified template; wherein the respective new digital certificate is to comprise a respective digital signature created using a decrypted form of a private key of the specialized certificate authority; and return, in response to each request of the plurality of requests, the respective new digital certificate to the control plane of the customer service, wherein the control plane of the customer service provides the respective new digital certificate to the respective instance being added to the cluster of instances of the customer service;

a host of a control plane of a customer service implemented in the multi-tenant provider network to host the specialized certificate authority;

a highly available data store in the multi-store provider network to store an encrypted form of the private key of the specialized certificate authority; and a hardware security module in the multi-tenant provider network, the hardware security module configured to:
obtain the encrypted form of the private key from the highly available data store, decrypt the encrypted form of the private key to yield the decrypted form of the private key, and provide the decrypted form of the private key to the specialized certificate authority for use by the specialized certificate authority to create the digital signature of the respective new digital certificate for each request of the plurality of requests.

5. The system of claim 4, wherein the certificate management service includes second instructions that upon execution cause the certificate management service to:
receive a request to generate the specialized certificate authority, the request including a selection of the only one user-specified template.

6. The computer-implemented method of claim 1, wherein the endpoint comprises a uniform resource indicator (URI) unique to the specialized certificate authority.

7. The computer-implemented method of claim 2, wherein the endpoint comprises a uniform resource indicator (URI) unique to the specialized certificate authority.

8. The system of claim 4, wherein the endpoint comprises a uniform resource indicator (URI) unique to the specialized certificate authority.

9. The computer-implemented method of claim 1, wherein issuing, for each request of the plurality of requests, the respective new digital certificate as the only one type of digital certificate and using the only one customer-specified template comprises populating the only one customer-specified template with information received in the request, and issuing the respective new digital certificate using the only one customer-specified template populated with information received in the request.

10. The computer-implemented method of claim 2, wherein issuing, for each request of the plurality of requests, the respective new digital certificate as the only one type of digital certificate and using the only one user-specified template comprises populating the only one user-specified template with information received in the request, and issuing the respective new digital certificate using the only one user-specified template populated with information received in the request.

11. The system of claim 4, wherein the specialized certificate authority service further comprises instructions that upon execution cause the specialized certificate authority service to issue, for each request of the plurality of requests, the respective new digital certificate as the only one type of digital certificate and using the only one user-specified template based on populating the only one user-specified template with information received in the request, and issuing the respective new digital certificate using the only one user-specified template populated with information received in the request.

\* \* \* \* \*